March 22, 1927.
K. W. COLLAMORE
1,621,582
FRAME FOR AUTOMOBILE LICENSE PLATES
Filed April 9, 1926
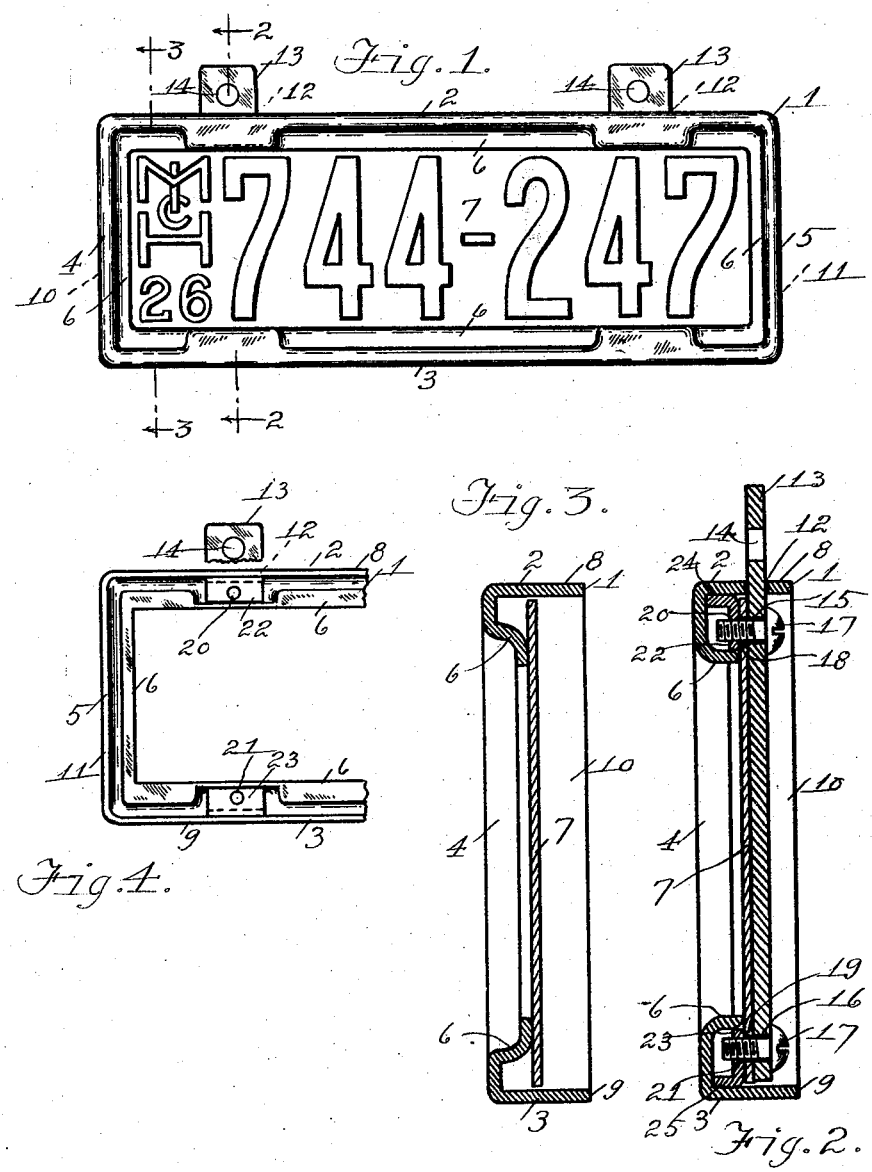
INVENTOR.
Kenelm W. Collamore
BY
Cyrus W. Rice
ATTORNEYS.

Patented Mar. 22, 1927.

1,621,582

UNITED STATES PATENT OFFICE.

KENELM W. COLLAMORE, OF GRAND HAVEN, MICHIGAN.

FRAME FOR AUTOMOBILE LICENSE PLATES.

Application filed April 9, 1926. Serial No. 100,852.

The present invention relates to frames for automobile license-plates; and its object is, generally, to provide a frame for such plates which shall conceal from view the holes through which the means for mounting such plates extend, and which shall hold such plates securely in position on the automobile; and further, to provide in such frames improved means for mounting the same; and further, to provide in such frames improved means whereto the fastening means of the plates to the frame may be secured.

These and any other objects hereinafter appearing are attained by, and the invention finds preferable embodiment in, the structure hereinafter particularly described in the body of this specification and illustrated by the accompanying drawings, in which:

Figure 1 is a face view of a frame and of an automobile license-plate held therein;

Figure 2 is a vertical sectional view thereof taken on line 2—2 of Figure 1;

Figure 3 is a vertical sectional view of the same taken on line 3—3 of Figure 1; and Figure 4 is a rear view of a portion of the frame and of a portion of its support.

In the embodiment of the invention illustrated by the accompanying drawings, a frame 1 comprising spaced opposite upper and lower side members 2, 3 and spaced opposite end members 4, 5 is shown. This frame is desirably made from sheet metal by stamping or die-pressing the same into the form shown. The portions 6 of said members extend inwardly and also desirably rearwardly, as particularly well seen in Figures 2 and 3, and form the parts of the frame against which the face of the license-plate 7 adjacent its edges abuts. The upper member 2 of the frame (and desirably the other members 3, 4 and 5 thereof) have rearwardly extending flanges 8, 9, 10, 11 respectively, which impart rigidity to the structure. The flange 8 of the upper member 2 of the frame is provided with spaced openings 12 therethrough, through which extend the supports or bars 13 respectively, whereby the frame and license-plate carried thereby are mounted on the automobile, as by bolts (not shown) passed through the apertures 14 in the supports' upper ends which protrude above the frame. These supports have orifices 15, 16 therethrough, through which extend fastening means, as the screws 17, which extend through the license-plate's usual slots 18, 19 and are turned in threaded holes 20, 21 in the upper and lower members 2, 3 of the frame respectively. These holes 20, 21 are desirably provided in the portions 22, 23 of the frame, said portions being spaced inwardly from the rear side of its members 2, 3 as shown, so that the screws 17 may be turned to a position wherein the supports, the license-plate and frame are securely clamped together, and yet the inner ends of the screws are spaced from the frame's said members 2, 3. These portions 22, 23 are desirably formed of separate metal pieces from the frame itself and are united therewith by spot-welding or like processes, at 24, 25.

The invention being intended to be pointed out in the claim, is not to be limited to or by details of construction of the particular embodiment thereof illustrated by the drawings or hereinbefore described.

I claim:

In a structure of the character described: a frame adapted to hold an automobile license-plate and comprising spaced opposite members having portions spaced inwardly therefrom provided with threaded holes, one of said members having a rearwardly extending flange provided with an opening therethrough; a support extending through said opening and having orifices therethrough; screws extending through said orifices and through the license-plate and turning in said threaded holes respectively.

In testimony whereof I have hereunto set my hand at Grand Rapids, Michigan, this 6th day of April, 1926.

KENELM W. COLLAMORE.